(12) United States Patent
Movassaghi et al.

(10) Patent No.: US 7,646,900 B2
(45) Date of Patent: Jan. 12, 2010

(54) DEVICE AND METHOD FOR GENERATING A THREE DIMENSIONAL VASCULAR MODEL

(75) Inventors: Babak Movassaghi, Hamburg (DE); Volker Rasche, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 218 days.

(21) Appl. No.: 10/567,221

(22) PCT Filed: Aug. 9, 2004

(86) PCT No.: PCT/IB2004/051428

§ 371 (c)(1),
(2), (4) Date: Feb. 3, 2006

(87) PCT Pub. No.: WO2005/020155

PCT Pub. Date: Mar. 3, 2005

(65) Prior Publication Data

US 2006/0250386 A1    Nov. 9, 2006

(30) Foreign Application Priority Data

Aug. 21, 2003  (EP)  ................................. 03018988

(51) Int. Cl.
*G06K 9/00* (2006.01)
(52) U.S. Cl. .................. 382/128; 382/100; 382/130; 382/131; 382/132; 382/154; 600/500; 600/508
(58) Field of Classification Search .......... 382/100, 382/128, 130, 131, 132, 154
See application file for complete search history.

(56) References Cited

U.S. PATENT DOCUMENTS 6,047,080 A * 4/2000 Chen et al. ................ 382/128

| | | | |
|---|---|---|---|
| 7,015,951 B1 * | 3/2006 | Yoshigahara et al. ... | 348/207.99 |
| 7,180,976 B2 * | 2/2007 | Wink et al. ................ | 378/8 |
| 2006/0210134 A1 * | 9/2006 | Grass et al. ............... | 382/130 |

FOREIGN PATENT DOCUMENTS

| WO | 9749065 A1 | 12/1997 |
|---|---|---|
| WO | 9749065 A1 | 6/2007 |

OTHER PUBLICATIONS

Hoffmann, Kenneth R., Whale, Andreas, Pellot-Barakat, Claire, Sklansky, Jack, & Sonka, Milan, "Biplane X-ray angiograms, intravascualr ultrasound, and 3D visualization of coronary vessels", International Journal of Caridac imaging, col. 15 No. 6 Dec. 1999, pp. 495-512.*

(Continued)

*Primary Examiner*—Matthew C Bella
*Assistant Examiner*—Eric Rush

(57) ABSTRACT

The invention relates to a method for the reconstruction of a three-dimensional model of a vascular tree from two-dimensional X-ray projection images (A, B, C) that are taken from different spatial directions. On a first projection image (A) at least one reference point ($C_A$) is specified. The gray-value profiles along the epipolar lines ($E_B$, $E_C$) for said reference point ($C_A$) in other projection images (B, C) are then projected on the projection line (L) of the reference point ($C_A$) and added there punctiformly to form a sum profile (S). The sum profile (S) has an extreme, for example, a gray-value minimum, at the position of the space point ($C_{3D}$) belonging to the reference point ($C_A$). In this way, it is possible to reconstruct semiautomatically a vascular tree from X-ray projections.

15 Claims, 2 Drawing Sheets

OTHER PUBLICATIONS

Kenneth R. Hoffmann, Andreas Wahle, Claire Pello-Barakat, Jack Sklansky & Milan Sonka, "Biplane X-ray Angiograms, Intravascular Ultrasound, and 3D Visualization of Coronary Vessels" International Journal of Cardiac imaging, Dordrecht, NL, vol. 15 No. 6 Dec. 1999 Pertinent pp. 495-512.*

D. Delaere: Knowledge-Based System for the Three-Dimensional Reconstruction of Blood Vessels From Two Angiographic Projections, 1991, vol. 29, NS27-NS36.

Hoffmann K R et al: Biplane X-Ray Angiograms, Intravascular Ultrasound and 3D Visualization of Coronary Vessels Dordrecht, vol. 15, No. 6, Dec. 1999, pp. 495-512, XP000922535.

Lee J Y et al: 3-D Image Reconstruction of Brain Vessels from Angiograms, IEEE Nov. 1996, pp. 547-552, XP010236734.

Nurit Harpaz. et al: Towards the Automatic Reconstruction of a 3-D Animated Model for the Coronary Tree from Biplane Angiograms, IEEE vol. 2, Conf. 9, Nov. 1988, pp. 1012-1014, XP000119190.

"3-D Image Reconstruction of Brain Vessels from Angiograms" J.Y. Lee et al, 1996 IEEE TENCON Digital Signal Processing Applications p. 547-552.

"Biplane X-ray Angiograms, Intrvascular Ultrasound, and 3D Visualization of Coronary Vessels" K. Hoffmann et al, Int. Journal of Cardiac Imaging, 15 p. 495-512 1999.

"Towards the Automatic Reconstruction of a 3-D Animated Model for the Coronary Tree from Biplane Anglograms" N. Harpaz et al, 1988 IEEE, p. 1012-1014.

* cited by examiner

DEVICE AND METHOD FOR GENERATING A THREE DIMENSIONAL VASCULAR MODEL

The invention relates to a device and a method for generating a three-dimensional model of a spatial structure, which may be, in particular, a vascular tree.

Three-dimensional models of a spatial structure are obtained from two-dimensional projection images of the structure in many applications, in which connection the reconstruction of a vascular tree is to be considered here to be representative. Such a reconstruction is necessary, for example, in the diagnosis of ischemic heart diseases with as high a precision as possible in regard to the route and the size of the coronary vessels. In this connection, within the framework of the three-dimensional X-ray rotation angiography, an X-ray unit is rotated around a patient to be examined while it generates two-dimensional X-ray projections of the heart from different spatial directions. As a rule, a contrast medium is injected into the coronary vessels during the image-taking to display them better on the X-ray images.

Of the X-ray projections produced, however, because of the spontaneous movement of the heart as a result of the heartbeat, only those can be used for the reconstruction of a three-dimensional model of the vessel route that originate from the same movement phase of the heart. Typically, a suitable selection of the usable projection images is therefore made with the aid of an electrocardiogram recorded in parallel.

Furthermore, because of the vessel route, which is as a rule very complicated, and the limited imaging quality, the required three-dimensional model must currently be completely reconstructed manually. This means that reference points along the route of the vessel central lines and also, optionally, other parameters (vessel diameter, bifurcation points, etc.) have to be specified on a first selected projection image. The corresponding points or sizes are then selected manually on a second projection image, which must originate from a similar heartbeat phase, as a result of which the required model is established (cf. T. J. Keating, P. R. Wolf, F. L. Scarpace, "An improved method of digital image correlation", Photogrammetric Eng. Remote Sensing, vol. 41, 993-1002, 1975; C. Smets, F. van deWerf, P. Suetens, A. Oosterlinck, "Knowledge-based system for the three-dimensional reconstruction of blood vessels from two angiographic projections", Med. Biol. Eng. Comp., vol. 29, NS27-36, 1991).

Against this background, the object of the present invention was to provide means for the simpler and reliable reconstruction of a three-dimensional model of a spatial structure, such as, in particular, a vascular tree.

This object is achieved by a device having the features of claim 1 and also by a method having the features of claim 10. Advantageous embodiments are contained in the dependent claims.

The device according to the invention serves to generate a three-dimensional model of a spatial structure, which may be, in particular, a vascular tree. The device comprises the following components:

a) An imaging unit for generating two-dimensional projection images of a structure from various directions. Said imaging unit may be, in particular, a rotation X-ray unit, such as is used, for example, in computer tomography.

b) A display unit that is coupled to the imaging unit and has input means, in which connection the display unit may display one of the projection images generated by the imaging unit (which is denoted below as a "reference image") for a user so that the user can specify interactively at least one image point of the structure on said reference image as a reference point.

c) A data processing device that is coupled to the imaging unit and the display unit and may be, in particular, a part of the imaging unit and can also assume in the latter tasks of controlling and image processing. The date processing device is designed to reconstruct, without interaction of a user, the space point determined belonging to a reference point of a structure, using the display unit, from further projection images; in this connection, the "further projection images" are those that were produced as the reference image from other directions using the image-processing device. The space point determined then corresponds to the required three-dimensional model or at least a part thereof.

The device described has the advantage that it makes possible the semiautomatic reconstruction of a three-dimensional model of a structure. In this case, unlike the known methods, the interactive specification of reference points by a user is only necessary on a first reference image. The associated space points of the structure are then automatically reconstructed by the data-processing device from said reference points with the aid of further projection images. Examples of suitable methods or algorithms for the automatic reconstruction are explained in the description below, but the invention is not restricted to the application of these specific solutions.

In accordance with a preferred embodiment, the data-processing device is designed to reconstruct the required space point belonging to a specified reference point by evaluating those image points of the "further projection images" that are on the respective epipolar line of the reference point. In this connection, the "epipolar line of the reference point in regard to a given projection image" is to be understood as that line that lies in said projection image and that results if the projection line of the reference point (i.e. the connecting line between the reference point and the projection center of the reference image) is projected on the given projection image. The epipolar line describes the residual uncertainty in regard to the position of a spatial point of which only the reference point is known as an image in the reference image. The automatic examination of the "further projection images" can consequently be restricted to the epipolar lines that are possible solely for geometrical reasons, which benefits the reduction of the computation effort.

A data-processing device can include a computer comprising computer instructions for obtaining two-dimensional projection images of a spatial structure taken from different directions, the images comprising a reference image and further projection images; displaying the reference image; obtaining a selection of a reference point on the reference image; determining epipolar lines for at least a portion of the further projection images, the epipolar lines being based on the reference point; determining the image intensity of image points of the further projection images that lie on the epipolar lines; determining a space point corresponding to the reference point of the spatial structure from a summation of at least a portion of the image intensities, wherein the space point is defined as that position at which the summation assumes an extreme; and generating a three-dimensional model of the spatial structure using the space point.

In a further aspect of the above-described embodiment, the data-processing device is furthermore designed to project the image-point values (i.e. for example, the gray values) of the image points lying on the epipolar lines of the reference point by computation on the projection line of the reference point and to add them therein in a punctiform manner to form a sum profile. The projection line of the reference point is, as already explained, that line that connects the projection center of the reference image to the reference point. The sum profile accumulates information items from the various further projection images and consequently makes possible inferences about the position of the required space point.

In this connection, the data-processing device may be designed, in particular, to define the required space point as that position on the projection line of the reference point at which the sum profile assumes on average (over all the projection images contributing to the sum profile) the image-point value of the reference point. If the structure at the required space point lying on the projection line is such, for example, that said space point yields in all its projections roughly the same gray value $x_0$, said gray value $x_0$ is preserved on average in the sum profile. Structure parts situated remotely from the projection line of the reference point and having a similar gray value $x_0$ yield, on the other hand, their contribution to the sum profile at different positions on the projection line, with the result that the average values formed at such positions differ, as a rule, from the value $x_0$. Of particular importance in this connection is the case where the image-point value $x_0$ of the reference point has an extreme value in regard to the possible image-point values, that is to say, for example, corresponds to a maximum absorption on an X-ray image; in this case, the sum profile at the position corresponding to the space point likewise assumes an extreme value, i.e. an absolute minimum. This case is of particular practical importance since space points in a structure (for example, a biological one) are, as a rule, displayed on different X-ray projection images with different absolute gray values, that is to say, do not have approximately the same gray value $x_0$ on all images. In contrast, the property of having an extreme gray value (referred to the respective projection) is, as a rule, preserved well in the various projections.

The spatial structure reconstructed using the device can, in principle, have any required shape, for example a spherical shape or the like. In particular, it can have a linear route so that, by definition, its extension in the direction of a line (optionally curved and/or bifurcated) is greater than in the directions perpendicular thereto. The vascular tree already mentioned repeatedly is a typical example of a bifurcated linear structure. To reconstruct such structures, the data-processing device is preferably designed to reconstruct the linear route in a three-dimensional model with the specification of a plurality of reference points on a reference image. Typically, a user in this case specifies the route of center lines of the structure on a projection image by hand, so that the data-processing device can automatically reconstruct the remaining spatial route automatically.

In accordance with a further aspect of the above-described embodiment, the data-processing device is designed to determine the width of the linearly extending structure from the projection of the reconstructed three-dimensional model of the structure on the projection images used for the reconstruction of said model. In this way, the information of all the projection images is first used to reconstruct the three-dimensional linear route of the structure and, in a second step, the result of said reconstruction is then used for determining the width in every single projection image.

The structure imaged is, in many application cases, subject to a cyclic spontaneous movement. This is the case, in particular, for a vascular system, which is subject to the constant action of the heartbeat and the respiration. For such applications, the device preferably comprises means for determining a characteristic parameter of the cyclic spontaneous movement. In connection with vascular systems, the means may be, in particular, an electrocardiography apparatus for recording the electrical heart activity (ECG). Furthermore, the data-processing device is in this case designed to use only those projection images for the reconstruction of a space point that originate from the same phase of the spontaneous movement as the reference image belonging to said space point. This ensures that the imaged structure has assumed approximately the same spatial position during the image-taking operation of the projection images used.

It is, however, pointed out that the device does not have to rely on the described selection of projection images from the same movement phases. On the contrary, it is an advantage of the above-explained specific method using the calculation of a sum profile that projection images originating from other movement phases may also be used since their possibly geometrically inconsistent contributions are averaged out. An expensive preselection of projection images, which requires not least the determination of an additional parameter, such as, for example, the ECG, can therefore be dispensed with. In this respect, it is furthermore advantageous that the information obtained in all the projection images is utilized maximally.

The invention relates in addition to a method for generating a three-dimensional model of a spatial structure comprising the following steps:

a) generation of two-dimensional projection images of the structure taken from different directions;

b) display of one of the projection images as a reference image in order to make possible the interactive specification of at least one image point of the structure as a reference point;

c) automatic determination of the space point, belonging to the specified image point, of the structure from the further projection images generated.

In general form, the method reflects the steps that can be executed with a device of the above-described type. For the more detailed explanation of the method, its advantages and its variants, reference is therefore made to the above description.

These and other aspects of the invention are apparent from and will be elucidated with reference to the embodiments described hereinafter.

In the drawings:

FIG. 1 shows diagrammatically a three-dimensional vascular tree G, which may be, for example, part of the coronary vessels. From the vascular tree G, as accurate as possible a model of its three-dimensional route is to be determined, which model is, in addition, also to reproduce the respective width of the vessel.

To reconstruct the required model, two-dimensional projection images A, B, C of the vascular tree G are generated with the aid of a rotation X-ray unit not shown in greater detail, in which connection more than the three projections shown are produced in practice. The respective projection centers (that is to say, the positions of the X-ray source) are denoted by $F_A$, $F_B$ and $F_C$. To achieve an adequate reliability of the model, the interactive collaboration of a user is necessary in its reconstruction since the projection images have only a limited precision, the structure of a vascular tree is normally very complex and the position and shape of the vascular tree changes cyclically from projection image to projection image due to the heartbeat.

Figure 1:
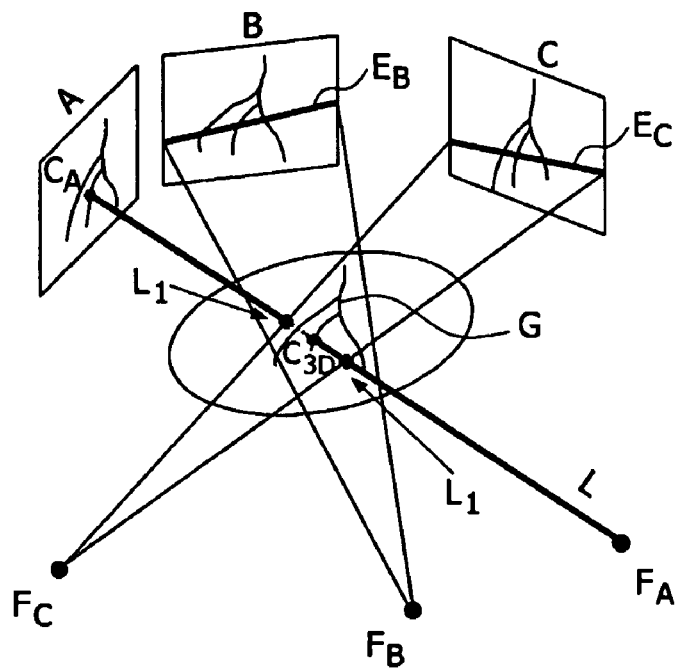
FIG. 1 shows, in a diagrammatic perspective, the relationships in a two-dimensional central projection of a vascular structure G on three projection images A, B, C, and also the position of a reference point $C_A$ on a reference image A.

The interaction of a user takes place in the method at present considered in that the user specifies on a (for example, arbitrarily selected) projection image A, denoted below as "reference image", points along the route of the center line of the vessels or vessel segments of interest. For this purpose, the reference image A may be displayed on a monitor so that the user can mark said points with the aid of a pointer appliance, such as, for instance, a mouse. In this regard, FIG. 1 shows one of the points marked manually by the user, the so-called reference point $C_A$.

Proceeding from the above-explained scenario, the object to be achieved automatically by a device according to the invention consists in finding for the reference point $C_A$ specified interactively in the reference image A that associated space point $C_{3D}$ on the vascular tree G that is imaged by the reference point $C_A$. In this connection, the vector pointing from the projection center $F_A$ of the reference image A to the reference point $C_A$, i.e. the "projection line" of $C_A$, is denoted below by $\underline{L}$, the required space point $C_{3D}$ lying at an unknown position on the projection line. The further projection images B, C are used to determine said position.

In this connection, the epipolar lines $E_C$ and $E_B$, which are defined as the projection of the vector $\underline{L}$ on the respective projection image C or B are considered on the projection images B, C. With the assumption (still to be tested) that the vascular tree G has the same spatial position in the generation of all the projection images A, B and C considered, the image points belonging to the required space point $C_{3D}$ must lie on said epipolar lines $E_C$, $E_B$. In a completely manual method, the position of the image point of $C_{3D}$ on the epipolar line $E_C$ could, in this connection, be determined on a second projection image, for example C, by hand, from which the required spatial position of $C_{3D}$ could then be calculated. Such a procedure has, however, the disadvantage that two different projection images (A and C) have to be evaluated manually, the correct determination of the corresponding point on the second projection image being, as a rule, very difficult. Furthermore, the information contained in all the other projection images is left out of consideration. According to the invention, a method for the automatic location of the space point $C_{3D}$ on the vector $\underline{L}$ is therefore proposed.

Figure 2:
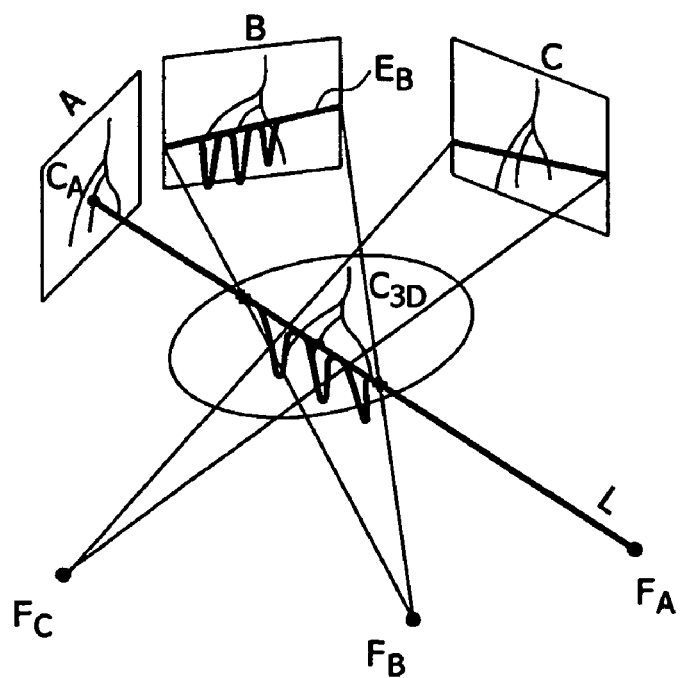
FIG. 2 shows, in a diagram corresponding to FIG. 1, the contributions of a gray-value profile from a first projection B.

In a first step of said method, the one-dimensional gray-value profile is determined along the epipolar line $E_B$ in a first projection image B. FIG. 2 also shows the associated route of the profile along the epipolar line $E_B$ both correspondingly scaled and projected on the vector $\underline{L}$.

Figure 3:
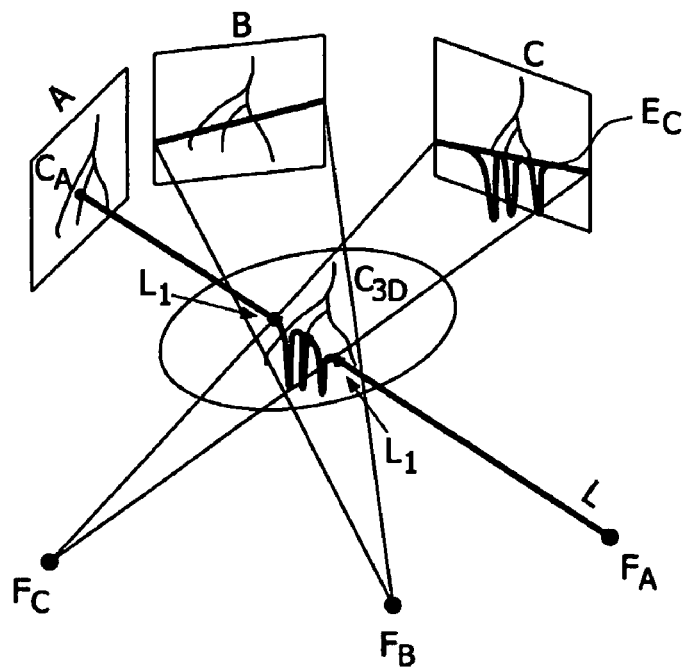
FIG. 3 shows, in a diagram corresponding to FIG. 1, the contributions of a gray-value profile from a second projection C.

FIG. 3 shows the same procedure for another projection image C and the associated epipolar line $E_C$. The vascular tree G, which is assumed to be opaque to X-rays, manifests itself in all the images A, B, C through low gray values, that is to say through downward deflections in the gray-value profiles.

Figure 4:
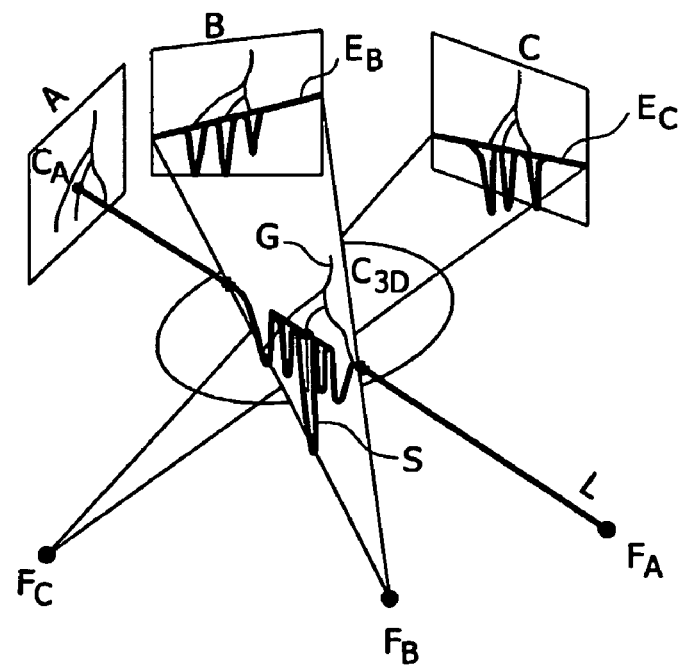
FIG. 4 shows the additive superimposition of the contributions in accordance with FIGS. 2 and 3 to a sum profile S.

FIG. 4 shows the calculation of a sum profile S that is made up additively from the gray-value profiles, projected on the vector $\underline{L}$, of the individual projection images B, C (FIGS. 2, 3). Only the required space point $C_{3D}$ lying on the vector $\underline{L}$ has a minimum at the same position in all the individual projected gray-value profiles. Minima of vascular branches that do not intersect the vector $\underline{L}$ are, on the other hand, projected in each case at another position on the vector $\underline{L}$. For these reasons, the location of the required space point $C_{3D}$ is emphasized in the sum profile S by constructive superimposition, whereas the contributions of other vascular segments are destructively added, that is to say essentially averaged out. The position of the gray-value minimum in the sum profile S can consequently be defined as the actual spatial position of the required point $C_{3D}$.

The method described qualitatively above will be formulated more precisely mathematically below. In doing so, all the possible spatial positions of the required point $C_{3D}$ are described in parameterized form by the following equation:

$$\underline{P}(\lambda) = \underline{F}_A + \lambda \frac{\underline{L}}{|\underline{L}|}, \quad (1)$$

where $\underline{F}_A$ is the radius vector of the projection center of the reference image A and $\underline{L}/|\underline{L}|$ is a basis vector in the direction of $\underline{L}$. The projection, leading to an image point $\underline{X}_i=(x_i,y_i)$, of any space point $\underline{P}$ on a projection image i that belongs to a given angle $\alpha$ of the C-arm of the X-ray unit can be calculated by the projection matrix $\underline{M}_\alpha$ in accordance with:

$$\begin{pmatrix} x_1 \\ x_2 \\ x_3 \end{pmatrix} = \underline{M}_\alpha \begin{pmatrix} P_x \\ P_y \\ P_z \\ 1 \end{pmatrix}, \text{ where } x_i = x_1/x_3, y_i = x_2/x_3 \quad (2)$$

In addition, let $g_i(\underline{X}_i)$ be the gray value in said projection image i at the positions $\underline{X}_i$. With the aid of this function, a "sum profile" gray value $S(\underline{P}(\lambda))$ can then be assigned to every point $\underline{P}(\lambda)$ on $\underline{L}$ in accordance with the following formula:

$$S(\underline{P}(\lambda)) = \sum_{i=1}^{n} g_i(\underline{X}_i) \quad (3)$$

In this equation, $\underline{X}_i$ is the two-dimensional projected position of $\underline{P}(\lambda)$ in a certain projection image i that can be determined from equation (2); n is the maximum number of projection images involved.

The projection C, which is substantially at 90° to the reference image A, is imaged with minimum width on the vector $\underline{L}$ and therefore determines the boundaries L1 of the region on $\underline{L}$ that is overlapped by the gray-value profiles of all the projections. As FIG. 2 shows, the projected gray-value profile of every projection B not at 90° is stretched on the vector L with respect to the 90° projection C.

In the linear structures, such as the vascular tree G, the minima or valleys in a given gray-value profile stand for potential positions at which a vessel may be situated in space. In the sum profile S, said minima add constructively only at the required space point $C_{3D}$, whereas the superimposition is destructive for the other "candidates" and result in an averaging out (an exception occurs if the vascular tree G intersects the vector $\underline{L}$ more than once; in this special case, the sum profile S accordingly has many minima).

The projection images A, B, C used for the reconstruction may optionally be selected by means of a parallel recording of the electrocardiogram in such a way that they all belong to the same phase of the heart cycle. Of special advantage in the method described, however, is the fact that such a preselection is not absolutely necessary since the contributions of the projection images from unsuitable heart phases average out. The method can therefore be made simpler by dispensing with a selection and the information from all the projection images can be used simultaneously.

In addition, the method described also makes it possible to determine the width of the vessels of the vascular tree G. A measure of this may, for example, be obtained from the width of the minimum in the sum profile S. Advantageously, however, a three-dimensional vascular tree once reconstructed is projected on all the available projection images A, B, C in order to display the center lines of the vessels therein. The respective vessel width can then be determined punctiformly along the vessel route in each of the projection images by evaluating, for example, the gray-value distributions transversely to the projected vessel route.

For the description of experimental examples, reference is made to the publication entitled "Accurate coronary modeling procedure using 2D calibrated projections based on 2D centerline-points on a single projection" by B. Movassaghi, V. Rasche, M. A. Viergever and W. J. Niessen (Proc. of SPIE Vol. 5370, pps. 2026-33, which is incorporated by reference in its full scope in the present application.

The invention claimed is:

1. A device for generating a three-dimensional model of a spatial structure comprising:
an imaging unit for generating two-dimensional projection images of the spatial structure from various directions;
a display unit that is coupled to the imaging unit for displaying one of the projection images as a reference image, in which connection the display unit comprises input means in order to make possible the interactive specification of at least one image point in a segment of the spatial structure as a reference point;
a data processing device that is coupled to the imaging unit and the display unit and is designed to reconstruct a space point corresponding to the reference point of the structure from further projection images produced from other directions using the image-processing unit, wherein the space point is reconstructed by evaluating other image points of the further projection images that lie on a respective epipolar line of the reference point, wherein gray scale values corresponding to the other image points are projected on a projection line of the reference point and added to form a sum profile having constructive superimposition of the gray values of multiple epipolar lines and averaging out the contributions of other vascular segments, thereby determining a space point of a vascular segment and wherein said space point is defined as that position on the projection line of the reference point at which the sum profile assumes an extreme.

2. A device as claimed in claim 1, wherein the imaging unit is a rotation X-ray unit.

3. A device as claimed in claim 1, wherein the data-processing device is designed to reconstruct said space point utilizing further projection images that are obtained during different cardiac phases.

4. A device as claimed in claim 3, wherein the gray scale values are added punctiformly to form the sum profile.

5. A device as claimed in claim 1, wherein the sum profile is only evaluated in a segment in which the gray scale values of all the further projection images have contributed to the sum profile.

6. A device as claimed in claim 1, wherein the spatial structure has a linear route and the data-processing device is designed to reconstruct said linear route from a specification of a plurality of reference points situated on the reference image.

7. A device as claimed in claim 1, wherein the data-processing device is designed to determine a width of the spatial structure from a projection of a reconstructed three-dimensional model on projection images of the spatial structure.

8. A device as claimed in claim 1, further comprising:
a cyclic movement detector for determining spontaneous movement associated with the spatial structure, wherein the data-processing device is designed to use only those further projection images for the reconstruction of the space point that originate from the same phase of the spontaneous movement as the reference image.

9. A method for displaying a three-dimensional model of a vascular spatial structure with an imaging unit comprising the following steps:
a) operating an imaging unit to generate two-dimensional projection images of the structure taken from different directions, the images comprising a single reference image and further projection images;
b) displaying the reference image;
c) using a pointer appliance to mark at least one image point on the single reference image in a segment of the spatial structure as a reference point;
d) operating a computer of the imaging unit to automatically find a space point corresponding to the reference point by performing the steps:
projecting gray scale values corresponding to image points on epipolar lines in the further projection images which correspond to the reference point on a projection line of the reference point;
summing the gray scale values to form a sum profile having constructive superimposition of the gray values of multiple epipolar lines and averaging out the contributions of other vascular segments, thereby determining a space point of a vascular segment defined as that position on the projection line of the reference point at which the sum profile assumes an extreme; and
e) repeating step d) for each image point marked on the reference image of the spatial structure in step c), thereby generating a three-dimensional model of a spatial structure;
f) displaying the three-dimensional model.

10. The method of claim 9, wherein the imaging unit is a rotation X-ray unit.

11. The method of claim 9, wherein the further projection images are obtained during different cardiac phases.

12. The method of claim 9, wherein the sum profile is only evaluated in a segment in which the gray scale values of all the further projection images have contributed to the sum profile.

13. The method of claim 9, wherein the spatial structure has a linear route and a plurality of reference points on the reference image are marked.

14. The method of claim 9, further comprising determining a width of the spatial structure from a projection of the three-dimensional model on projection images of the spatial structure.

15. The method of claim 9, further comprising:
determining spontaneous movement associated with the spatial structure using an electrocardiograph apparatus, and wherein only those further projection images are utilized from the same phase of the spontaneous movement as the reference image.

* * * * *